US007548819B2

(12) United States Patent
Slothers et al.

(10) Patent No.: US 7,548,819 B2
(45) Date of Patent: Jun. 16, 2009

(54) SIGNAL MEASUREMENT AND PROCESSING METHOD AND APPARATUS

(75) Inventors: Ian Slothers, Norfolk (GB); Andrew Langley, Dorset (GB)

(73) Assignee: Ultra Electronics Limited, Middlesex (GB)

( * ) Notice: Subject to any disclaimer, the term of this patent is extended or adjusted under 35 U.S.C. 154(b) by 0 days.

(21) Appl. No.: 10/787,251

(22) Filed: Feb. 27, 2004

(65) Prior Publication Data

US 2005/0192765 A1    Sep. 1, 2005

(51) Int. Cl.
*G01R 15/00*    (2006.01)
*G01R 27/00*    (2006.01)

(52) U.S. Cl. .............. 702/57; 324/207.16; 324/426; 702/65; 340/538.15; 361/38

(58) Field of Classification Search .......... 702/57–59, 702/158, 189, 65; 324/207.12, 207.13, 207.16, 324/207.26, 202, 234, 426, 537, 538, 605, 324/658, 663; 340/686.6; 439/694; 716/1; 73/658; 361/38
See application file for complete search history.

(56) References Cited

U.S. PATENT DOCUMENTS

| | | | |
|---|---|---|---|
| 3,935,542 A | 1/1976 | Buck | 331/65 |
| 4,176,555 A | 12/1979 | Dorman | 73/658 |
| 4,219,740 A | 8/1980 | Little | 307/116 |
| 4,426,616 A | 1/1984 | Maier | 324/658 |
| 4,433,286 A | 2/1984 | Capots et al. | |
| 4,622,535 A * | 11/1986 | Ise et al. | 340/538.15 |
| 4,816,745 A | 3/1989 | Schneider | |
| 4,845,428 A | 7/1989 | Burreson | |
| 4,845,429 A | 7/1989 | Burreson | 324/234 |
| 4,954,782 A | 9/1990 | Ball | |
| 5,180,978 A | 1/1993 | Postma et al. | 324/207.16 |
| 5,285,154 A | 2/1994 | Burreson | 324/207.16 |
| 5,331,277 A | 7/1994 | Burreson | 324/207.16 |
| 5,351,004 A | 9/1994 | Daniels et al. | 324/207.13 |
| 5,351,010 A | 9/1994 | Leopold | |
| 5,410,488 A | 4/1995 | Andersen, III | 702/158 |
| 5,469,071 A | 11/1995 | Obata | |
| 5,488,566 A | 1/1996 | Woolsey | 716/1 |
| 5,600,249 A | 2/1997 | Yagi | |
| 5,691,639 A | 11/1997 | Demma et al. | 119/51.01 |

(Continued)

FOREIGN PATENT DOCUMENTS

DE    42 10 164 A1    9/1993

(Continued)

*Primary Examiner*—John H Le
(74) *Attorney, Agent, or Firm*—Dickstein Shapiro LLP

(57) ABSTRACT

Apparatus for generating an output dependent upon the impedance or at least one component of the impedance of a device includes a load component having a known impedance or component thereof for connection in series with the device; a measurement channel for measuring voltages; a switch arrangement connected to the measurement channel for switching the measurement channel to sequentially measure a first voltage on a first side of the load component and a second voltage on a second side of the load component or a voltage difference across the load component; a processing arrangement connected to the measurement channel for processing the sequentially measured voltages to generate an output dependent upon the impedance or at least one component of the impedance of the device; and a signal generating arrangement for generating an electrical signal for application to the series connected load component and device.

75 Claims, 5 Drawing Sheets

U.S. PATENT DOCUMENTS

| | | | |
|---|---|---|---|
| 5,704,813 A | 1/1998 | Weeks et al. | 439/694 |
| 5,801,530 A | 9/1998 | Crosby et al. | 324/207.26 |
| 5,912,829 A | 6/1999 | Maier | 708/404 |
| 6,014,022 A | 1/2000 | Demma et al. | 324/207.12 |
| 6,025,711 A | 2/2000 | Demma et al. | 324/207.26 |
| 6,424,145 B1 | 7/2002 | Woolsey et al. | 324/202 |
| 6,424,146 B2 | 7/2002 | Demma et al. | 324/207.16 |
| 6,507,189 B2 | 1/2003 | Woolsey et al. | 324/207.26 |
| 6,545,612 B1 | 4/2003 | Lindgren et al. | 340/686.6 |
| 6,570,377 B1 | 5/2003 | Demma et al. | 324/207.26 |
| 6,816,797 B2 * | 11/2004 | Freeman et al. | 702/65 |
| 2001/0019262 A1 | 9/2001 | Woolsey et al. | 324/207.26 |
| 2002/0077752 A1 | 6/2002 | Burreson et al. | 701/300 |
| 2002/0149376 A1 | 10/2002 | Haffner et al. | |
| 2002/0196025 A1 | 12/2002 | Freeman et al. | |
| 2003/0156367 A1 * | 8/2003 | Macbeth | 361/38 |
| 2003/0222639 A1 | 12/2003 | Slates | |
| 2003/0222656 A1 | 12/2003 | Phillips et al. | |

FOREIGN PATENT DOCUMENTS

| | | |
|---|---|---|
| DE | 44 11 428 A1 | 10/1995 |
| DE | 198 25 436 A1 | 12/1999 |
| DE | 101 50 548 A1 | 4/2003 |
| EP | 0 538 037 | 4/1993 |
| EP | 0 802 420 A2 | 10/1997 |
| EP | 0 884 597 A2 | 12/1998 |
| EP | 1279964 | 1/2003 |
| EP | 1 264 404 | 8/2003 |
| GB | 2076547 | 12/1981 |
| GB | 2 207 770 A | 2/1989 |
| GB | 2 268 811 A | 1/1994 |
| GB | 2 292 464 A | 2/1996 |
| GB | 2 363 855 A | 1/2002 |
| GB | 2363855 A | 9/2002 |
| JP | 020232568 A | 9/1990 |
| WO | WO 00/58752 | 10/2000 |
| WO | WO 01/65695 | 9/2001 |
| WO | WO 02/27354 | 4/2002 |
| WO | WO 2005/085883 A2 | 9/2005 |

* cited by examiner

SIGNAL MEASUREMENT AND PROCESSING METHOD AND APPARATUS

FIELD OF THE INVENTION

The present invention generally relates to a method and apparatus for measuring and processing electrical parameters related to an electrical arrangement.

BACKGROUND OF THE INVENTION

In some sensing and processing applications more than one quantity has to be measured by an electronic processing system. For some applications the absolute accuracy of the measure of each quantity is less important than the accuracy of one or more quantities relative to one or more other quantities.

For example in a control system where it is necessary to establish whether one quantity is bigger than another with a high degree of precision, so that the correct answer is given even if the larger input is for example only 0.1% bigger than the smaller, it is possible to use a two channel measurement system with absolute accuracy better than 0.05% for each channel in order to achieve the desired result. However, this absolute accuracy must be maintained under variations in the environment, such as time, temperature, pressure, and humidity. Such a high precision and stable system is expensive to produce because it requires expensive, close-tolerance, and stable components.

In an electrical system where it is desirable to measure or monitor the impedance or part thereof of a device, in the prior art it has been necessary to measure the current and voltage and to take the ratio in order to determine the impedance or part thereof in order to identify a change in impedance or part thereof. Such a device can for example comprise a proximity sensor. Such a sensor is disclosed in WO 01/65695, the content so which are hereby incorporated by reference. A sensor of this type provides a proximity measure whereby when a target is in the proximity of the device the impedance (or a component of impedance) of the device changes. WO 01/65695 discloses a method of proximity sensing in which the impedance of the proximity sensor is measured in order to detect a change of impedance. A known measurement system for use with proximity sensors such as that disclosed in WO 01/65695 is illustrated in FIG. 1. The proximity sensor 1 has an impedance Z which is required to be measured. The proximity sensor 1 is connected to earth and to a load resistance 2. A processor 3 is provided to digitally generate a drive wave form which is digital-to-analogue converted in a digital-to-analogue converter 4 to generate an analogue drive signal which is input through a low pass filter 5 and amplified by an amplifier 6 before being applied across the series connected load resistance 2 and proximity sensor 1. A voltage $v_S$ is measured as the voltage across the proximity sensor 1 by connecting a first analogue-to-digital converter 7 via a low pass filter 8. The output of the analogue-to-digital converter 7 is input to the processor 3. A second voltage $v_o$ is measured as the voltage across the series connected load resistance 2 and the proximity sensor 1. A second analogue-to-digital converter 9 receives the voltage signal $v_o$ via a second low pass filter 10 and inputs a digital representation of a voltage $v_o$.

In the prior art proximity sensor such as disclosed in WO 01/65695 the sensor typically consists of a coil with or without a core of permeable material. The provision of the core allows directing of the magnetic flux of the coil and enhancement of the inductance. Directing of the flux allows the designer to have control over the direction of sensitivity of the centre assembly.

As can be seen in FIG. 1, the sensor 1 is driven by a drive signal having a voltage and a resulting current which is of fluctuating nature and which can be sinusoidal or transient to allow the impedance to be evaluated.

If a sinusoidal voltage at angular frequency ω is applied, the voltage and resulting current are expressed as:

$$v_o(t) = \text{real}(V_o(\omega)e^{j\omega t})$$

and $$i(t) = \text{real}(I(\omega))e^{j\omega t}$$

where $V_o(\omega)$ and $I(\omega)$ are the complex amplitudes. All of the voltages and currents in the circuit, not just these two, can be similarly expressed via complex amplitudes.

Impedance $Z(\omega)$ at the frequency ω is defined as:

$$Z(\omega) = V_s(\omega)/I(\omega).$$

Also, impedance $Z(\omega)$ comprises:

$$Z(\omega) = R + j\omega L.$$

or $$Z(\omega) = R + 1/(j\omega C).$$

where R is the resistive component (the real component of impedance), L is the inductive component, and C is the capacitive component. It should be noted that the imaginary part of the impedance is frequency dependent and is usually termed the reactive component.

The portion of the current that is in phase with the voltage is often referred to as real or dissipative (or simply in phase) and is associated with the resistive behaviour of the coil and cables. The portion of the current that is in 'phase quadrature' or at 90 degrees to the voltage is often referred to as the imaginary, quadrature, or reactive component. It is associated with energy storage in the coil's electromagnetic fields, either due to its self-capacitance (electrostatic energy storage) or inductance (magnetic energy storage), or both.

The current is normally sensed by measuring the voltage produced by the current flowing through a known constant resistance in series with the coil and by using Ohm's law:

$$I(\omega)) = \Delta V(\omega)/R$$

where $\Delta V(\omega))$ is the complex amplitude of the voltage across the load resistance 2.

It can thus be seen from FIG. 1 that in order to determine the impedance the $v_s$ measure provides the complex voltage applied to the sensor 1 and the current can be determined from the voltage difference between the voltage measures $v_o$ and $v_s$ and the value of the load resistance 2.

Thus within the processor 3, the simultaneous measurements of $v_o$ and $v_s$ are used to determine the complex voltage and current applied to the sensor 1 in order to determine an impedance value for the sensor 1.

The impedance and/or inductance of the sensor's coil are altered by the presence of a nearby metallic target. The target alters inductance in the following ways. If a target is made from a material with permeability greater than the normal medium surrounding the coil, then its presence enhances the magnetic field coupling through and around the coil, and so increases its inductance. It should be noted that the permeability of some materials is affected to some degree both by the excitation frequency, by temperature, and by other magnetic fields. If the target is a permanent magnet, then drawing it near to the core induces magnetic flux in the core. This forces the core nearer to its magnetic saturation which, with well-behaved magnetization or 'BH' curves, reduces core permeability. The reduction in permeability appears as a reduction in the reactive component of the impedance and hence reduction in inductance. If the target is made from a conductive material, the eddy currents induced in the target by the fluctuating magnetic field of the coil generate their own field, which substantially opposes that produced by the coil. The net field appears as a reduced field to the coil, which incurs a reduction in inductance as the target approaches the coil. In addition, the eddy currents in the target introduce energy loss that appears in the sensor's impedance as an increase in resistance.

Thus in the prior art in order to detect a change in inductance of the sensor 1, a very accurate load resistor 2 is placed in series with the sensor 1 to act as a current sensor. Two voltage measurements are taken across the load resistor 2 simultaneously using two measurement channels comprising low pass filters 8, 10 and analogue-to-digital converters 7, 9. Within the processor 3 a value for the impedance Z is calculated by taking a ratio of the processed measurements. Thus in order to determine the impedance to high accuracy, it is necessary for the measurement channels to be closely matched and to include high precision components. Further, the prior art system requires an expensive, close-tolerance, series sense resistor to provide for current sensing. In addition, computation implemented within the processor 3 requires a division for computation of impedance. Such a division is computationally expensive and requires protection from out of range results such as divide by 0.

SUMMARY OF THE INVENTION

The general object of the present invention is to provide an improved signal measurement and processing method and apparatus. It is a specific object of one aspect of the present invention to provide an improved signal measurement and processing apparatus for generating an output in dependence upon the impedance or a component of impedance of a device.

A first aspect of the present invention provides an apparatus and method for measuring and processing a plurality of electrical parameters related to an electrical arrangement. A measurement channel is provided for measuring the parameters. A switch arrangement controls the measurement channel to provide for the sequential measurement of the parameters. A processing arrangement processes the sequentially measured parameters to generate an output. A signal generating arrangement is provided for generating an electrical signal for application to the electrical arrangement to generate the parameters.

Thus in accordance with this aspect of the present invention, a measurement and processing method and apparatus is provided in which the need for multiple measurement channels for multiple measured parameters is avoided by the use of a measurement channel which is switched for sequential measurement of the parameters.

In one embodiment, in order to provide stability and the required level of accuracy in the measurements, a drive signal for generating the measured electrical parameters is known during sequential measurements and the response of the electrical arrangement to the drive signal is relatively stable during the period of the sequential measurements.

In accordance with one embodiment of the present invention, the drive signal is a repetitive signal. It can be comprised of one or more periodic components. For example it can comprise a periodic waveform at one or a number of frequencies.

In one embodiment of the present invention, the signal generator arrangement generates a repetitive signal comprising sequential signal blocks for application to the electrical arrangement. The parameters comprise parameters of the signal as affected by the electrical arrangement and the switch arrangement switches the measurement channel to measure each of the parameters during the same part of the signal block of sequential signal blocks of the signal. The repetitive signal need only be strictly repetitive for two successive blocks (a block pair) since the measurements made for these blocks are used in a comparative manner in the processing. Successive block pairs can be of different phase to other block pairs.

In one specific embodiment of the present invention, the signal generating arrangement includes a digital store storing a signal pattern for at least a part of a said signal block. The generator means is provided for digitally generating a digital signal by repeatedly using the stored signal pattern and the generated digital signal is analogue-to-digital converted to generate the repetitive signal.

In one embodiment of the present invention, the electrical parameters comprise voltage and/or current and the processing arrangement processes the measured parameters to obtain the output in dependence upon impedance or at least one component thereof, such as one or more of resistance, capacitance and inductance.

Thus in this embodiment of the present invention, the processing can produce an impedance value or a value representing at least one component of impedance (such as one or a combination of resistance, capacitance and inductance) if required. However, where only an indication of a relative state of impedance or at least one component thereof is required, such as in a proximity sensor, the processing arrangement can more efficiently avoid the determination of an absolute measure of impedance or at least one component thereof and instead merely give an indication of whether a quantity related to the impedance or at least one component thereof is above or below a threshold.

In one embodiment of the present invention, a plurality of the measurement channels is provided and the switching arrangement is adapted to switch each of the measurement channels to sequentially measure the parameters to allow simultaneous measurements in the measurement channels. The processing arrangement processes the sequentially measured parameters for each channel to provide a plurality of results.

Thus, this embodiment to the present invention overcomes a limitation of the sequential measurement technique by performing multiple simultaneous measurements of parameters using multiple channels, where each channel is used to obtain measurements of each parameter to provide multiple results which are generated more frequently than for a single measurement channel. This reduces the effect of the delay caused by the sequential measurement technique.

One embodiment of the present invention is applied to the generation of an output in dependence upon impedance or at least one component thereof in which the electrical parameters comprise voltages, and the electrical arrangement comprises a load component having a known impedance or at least one component thereof connected in series with the device to allow for the measurement of a voltage drop across the load component. The signal generating arrangement applies a voltage to the series connected load component and device and switch arrangement switches the measurement channel to sequentially measure a first voltage on a first side of the load component and a second voltage on a second side of the load component or a voltage difference across the load component. The signal processing arrangement processes the measurements to generate the output in dependence upon the impedance of the device or at least one component thereof.

The load component can comprise any device that enables the voltage to current relationship to be known to enable a voltage measurement to be used as a current measurement. The load component can comprise any device that has an impedance. Such devices include resistors, capacitors, inductors and any combination thereof. Also the at least one component of impedance on which the output can depend can comprise any real, imaginary or complex part of the impedance and can for example comprise one or more of resistance, capacitance and inductance.

In one specific embodiment, the processing arrangement determines a parameter indicative of the complex amplitude of the first voltage on a first side of the load component connected to the device, and a second parameter indicative of the complex amplitude of a difference to voltage comprising the difference between the first and second voltages. Each of the first and second determined parameters is multiplied by the complex conjugate of the second determined parameter to generate third and fourth parameters respectively. The third and fourth parameters are then compared to generate the result. The comparison can be a scaled comparison. Thus in this embodiment to the present invention, the third and fourth parameters are merely compared and the result is not generated as a result of taking a ratio of parameters. In this embodiment, if the drive signal has more than one frequency, more than one first and second parameters are determined (one per frequency) and more than one third and fourth parameters are determined. These can be compared to obtain multiple results, which can be averaged. Alternatively, the multiple third and fourth parameters can be compared in combination to obtain the result.

In one embodiment, the processing arrangement is adapted to multiply said first voltage measurement by a factor based on a phase inverse of a complex signal of which one component of the generated signal is a part to determine said first parameter, to multiply said second voltage measurement by said factor to determine an interim parameter, and to subtract the first parameter from said interim parameter to determine said second parameter.

In an alternative embodiment, the processing arrangement is adapted to multiply said first voltage measurement by a factor based on a phase inverse of a complex signal of which one component of the generated signal is a part to determine said first parameter, to determine a difference voltage using said first and second voltage measurements, and to multiply said difference voltage by said factor to determine said second parameter.

In another embodiment, the processing arrangement is adapted to multiply said first voltage measurement by a factor based on a phase inverse of a complex signal of which the generated electrical signal is a part to determine said first parameter, and to multiply said voltage difference measurement by said factor to determine said second parameter.

In one embodiment, the measurement channel includes an analogue-to-digital converter for generating digital voltage measurements from the voltage measurements and the processing arrangement multiplies each of the voltage measurements by said factor. Said factor comprises a sampled version of $e^{-j\alpha x}$ plurality of digital samples. When the drive signal comprises more than one frequency $\omega$, said first and second voltage measurements are multiplied by said factor at each respective frequency to yield a plurality of results.

In one embodiment, the present arrangement is adapted to compare one or more components or derivatives of the third parameter and the fourth parameter to generate the result. For example, a component or derivative of the third parameter can comprise only the real part, only the imaginary part, or a magnitude where the third parameter is complex in these embodiments of the present invention, the multiplication of the first and second parameters by the complex conjugate of the second parameter forms a complex third parameter and a real fourth parameter. This enables the complex third parameter to be compared with the real fourth parameter without the need to take a ratio of the two. However, only the real or imaginary, or magnitude of the complex third parameter need be used in the comparison with the fourth parameter.

In one embodiment, an estimate of noise in the measurements is determined using averages of the third and fourth parameters over a plurality of measurements. The estimate of noise is used to determine whether to ignore the current comparison of the third and fourth parameters i.e. because of a high noise level. This embodiment to the present invention avoids erroneous measurements due to a high level of noise.

Another aspect of the present invention provides an apparatus comprising a load component having a known impedance or at least one component thereof connected in series with the device to allow for the measurement of a voltage drop across the load component; a generator arrangement for applying a voltage signal to the series load component and device; a measurement arrangement adapted to measure a first voltage one side of said load component, and a second voltage on the other side of said load component or a difference voltage comprising the voltage difference across said load component; and a signal processing arrangement for processing the measurements to generate an output in dependence upon the impedance or at least one component of the impedance of the device, wherein the signal processing arrangement is adapted to determine a first parameter indicative of the complex amplitude of the first voltage on a first side of said load component connected to said device and a second parameter indicative of the complex amplitude of said difference voltage or a calculated difference voltage comprising the difference between the first and second voltages, to multiply each of the first and second determined parameters by the complex conjugate of the second determined parameter to generate third and fourth parameters respectively, and to compare said third and fourth parameters to generate the output.

Another aspect of the present invention provides an apparatus and method for generating an output in dependence upon the impedance or at least one component of the impedance of a device, the apparatus comprising a load component having a known impedance or at least one component thereof for connection in series with a device to allow for the measurement of the voltage drop across the load component; a generator arrangement applying a voltage signal to the series connected load component and device; a measurement channel for measuring voltage; a switch arrangement for switching the measurement channel to sequentially measure a first voltage one side of said load component and a second voltage on the other side of said load component; and a signal processing arrangement for processing the measurements to identify a change of impedance or at least one component thereof.

A further aspect of the present invention provides a method of calibrating apparatus for generating an output dependent upon the impedance or at least one component of the impedance of a device. The apparatus includes a load component having a known impedance or at least one component of the impedance. The method comprises connecting a test load component having a known impedance or at least one component thereof to the apparatus in place of the device and in series with the load component. A voltage signal is applied across the series connected test load component and load component. Measurements indicative of the voltage across the test load component and current in the test load component are obtained and processed to determine a value dependent upon the impedance or at least one component thereof of the load component. The determined value is then stored for use by the apparatus for generating an output in dependence upon the impedance or at least one component of the impedance of a device during measurements made on the device.

A further aspect of the present invention provides a method of identifying a device having a characteristic of impedance or at least one component of impedance as a function of frequency, the method comprising: applying at least two frequency signals to said device; measuring the voltage across said device and the current flowing through said device at said frequencies; determining impedances or at least one component thereof for said device at said frequencies; and using said determined impedances or at least one component thereof to identify said device.

Another aspect of the present invention provides a method of identifying a device having an impedance characteristic as a function of frequency, the method comprising applying at least two frequency signals to said device; obtaining parameters indicative of the voltage across said device and the current flowing through said device at said frequencies; and comparing said parameters for said device with parameters for at least one other device to identify said device.

Another aspect of the present invention provides a method of identifying a device having an impedance characteristic as a function of frequency, the method comprising applying at least two frequency signals to said device; obtaining measurements indicative of the voltage across said device and the current flowing through said device at said frequencies; processing said measurements in a multiplicative and non divisional manner to determine if a first factor related to the impedance or part of the impedance of the device at a first frequency has a predefined inequality relationship with a second factor related to the impedance or part of the impedance of the device at a second frequency, and identifying the device in dependence upon the predefined inequality relationship.

In one embodiment, the predefined inequality relationship defines whether said first factor is greater than or less than said second factor times a predetermined constant and the constant is predetermined for identification of the device.

DESCRIPTION OF PREFERRED
EMBODIMENTS OF THE INVENTION

Figure 1:
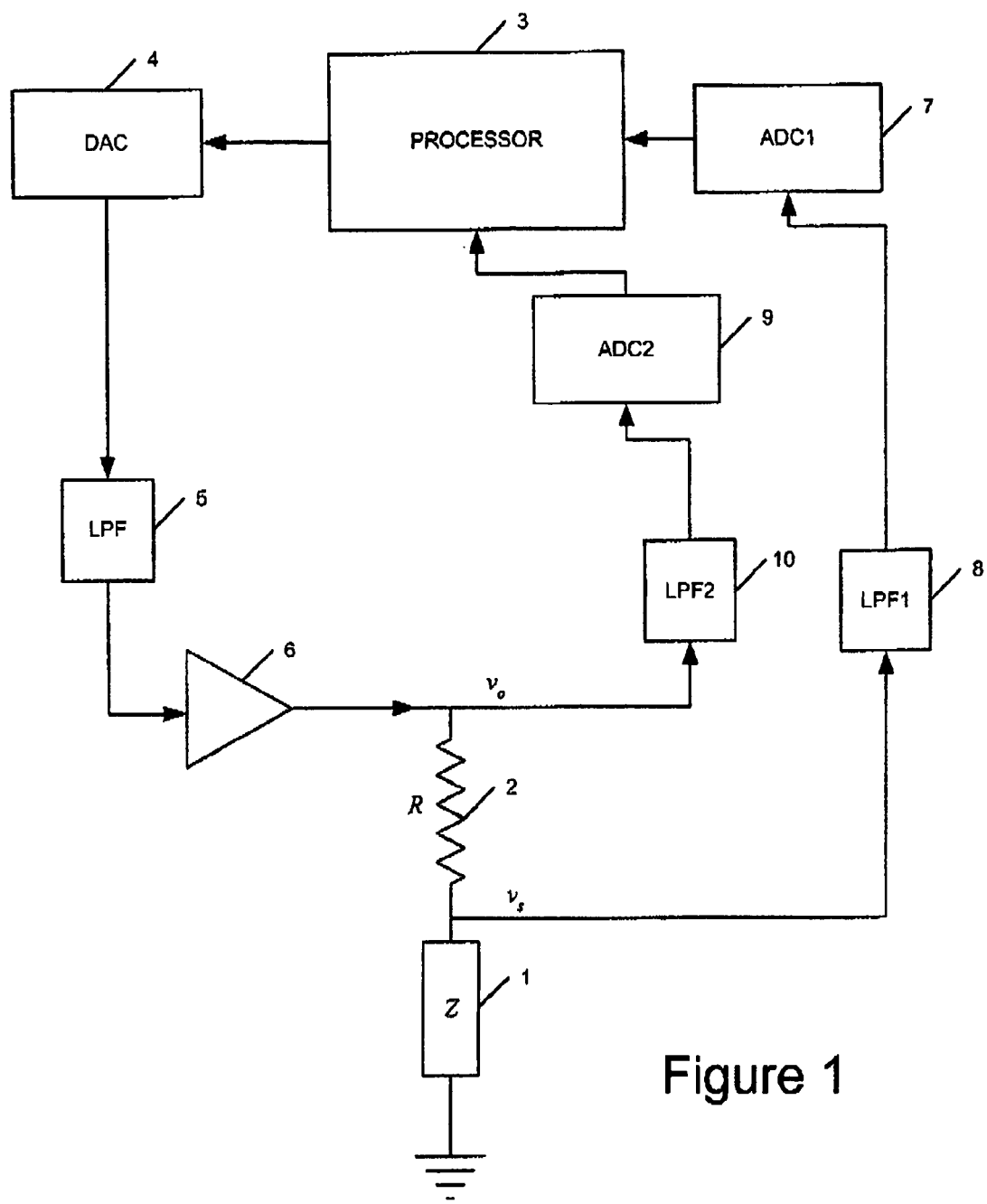
FIG. 1 is a schematic diagram of a prior art measurement and processing system.
Figure 2:
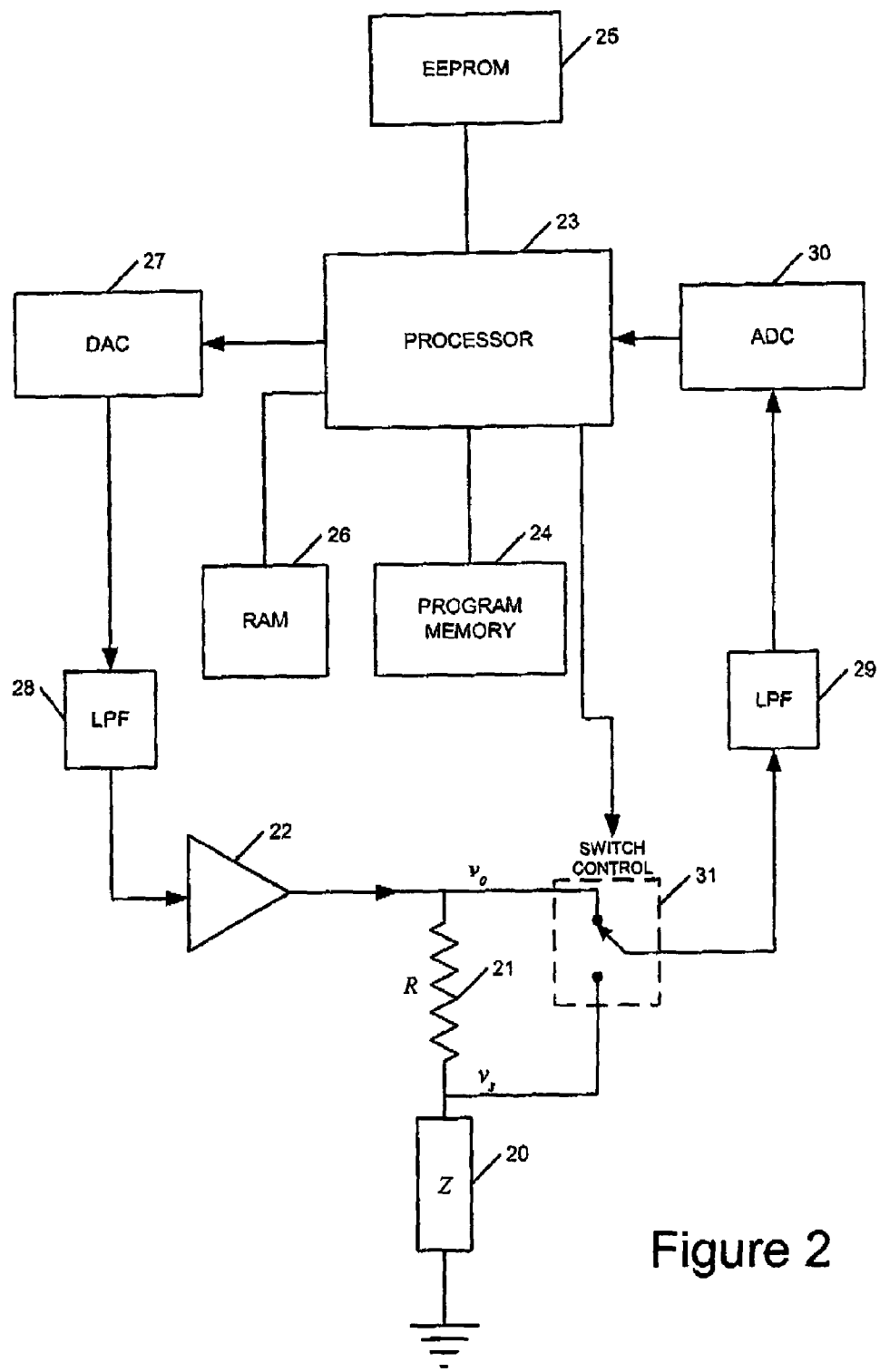
FIG. 2 is a schematic diagram of a measurement and processing system in accordance with a first embodiment of the present invention.

FIG. 2 illustrates a first embodiment of the present invention for the determination of a change of impedance of a device such as a proximity sensor 20. A load resistance 21 which is temperature and age stable and whose value is known and stored within the processing system is connected in series with the device 20. One end of the load resistance 21 is connected to an amplifier 22, which generates a drive signal comprising at least one sinusoidal signal. The other end of the load resistance 21 is connected to the device 20. A processor 23 is provided with a program memory 24 to control the operation of the processor. An erasable programmable read-only memory (EEPROM) 25 is provided to store data to be used by the processor 23. The data stored in the EEPROM 25 can include waveform generation data comprising a digital representation of at least a part of a waveform, Alternatively this can be stored in the program memory 24 or the random access memory (RAM) 26. The processor 23 is thus able to read the data from the EEPROM 25 in order to generate a continuous digital waveform which in this embodiment comprises a single wave form for simplifying explanation hereinafter. The storage of the waveform within the EEPROM 25 (or other memory location) makes the production of the digital drive waveform simple. A processor 23 is not required to perform calculations in order to determine output values for a cyclical waveform; instead values are simply repeatedly read out of the EEPROM 25.

A random access memory (RAM) 26 is provided to enable the processor 23 to store data during processing.

The digital drive signal output from the processor 23 is input to a digital-to-analogue converter 27 to generate an analogue wave signal which is passed through a low pass filter 28 and input to the amplifier 22 to generate the drive signal to the load resistor 21. The low pass 'reconstruction' filter 28 reduces undesirable artefacts of the digital-to-analogue conversion process. In an alternative embodiment the DAC 27 can be replaced with a pulse width modulated digital output directly from the processor 23.

The resistance value of the load resistor 21 can be stored in the EEPROM 25, the program memory 24 or the RAM 26 for use in data processing. In fact to avoid the requirement for a division in the computation, the reciprocal of the resistance value may be stored so that a multiplication operation can be used in the calculation instead.

The processor 23, the DAC 27, the ADC 30, the EEPROM 25, the RAM 26 and the memory 24 can all be provided on a microcontroller such as the Microchip PIC series. Thus the microcontroller can perform the function of signal generation and signal processing.

In this embodiment of the present invention a single measurement channel is provided comprised of a low pass filter 29 and an analogue-to-digital converter 30 to provide a digitised input to the processor 23. The measurement channel is connected to a switch arrangement 31, which receives as inputs connections from either side of the load resistor 21. The switch arrangement is controlled by a control signal from the processor 23 to switch between measurements of the voltages $v_o$ and $v_s$ either side of the load resistor 21.

The processor 23 controls the generation of the sinusoidal output signal to be in synchronism with the measurements input from the analogue-to-digital converter. Thus the waveforms are generated and measured synchronously. The processor 23 can comprise a microcontroller to control the output as well as the acquisition of the input samples. The output sequence comprises a block of samples during which the switch 31 is controlled so that the measurement channel measures the voltage on one side of the load resistor 21 i.e. during one measurement period. The block of samples may contain any multiple of cycles of a periodic waveform, such as a single sinusoid. The processor 23 then controls the switch 31 to switch to receive measurements of the voltage on the other side of the load resistor 21 and during this measurement period the processor 23 outputs a sequence identical to the previous sequence. Thus during pairs of measurement periods the output sequences are identical. It is thus preferable for the successive measurements to occur over successive blocks. The blocks need not be consecutive. It is possible for there to be a quiescent period between measurements, or the blocks can be filled with an initial number of zeros. However, to avoid latency it is preferred that measurements are taken successively and each measurement period comprises a whole block of data In order to compensate for any transient factors, it is possible for the first part of the responses to the output to be discarded or not measured to allow for settlement. It is preferred that the measurements be taken during the same section of successive blocks to avoid for the need for any phase compensation. However, the present invention encompasses the possibility of compensating for different phase measurements. The blocks themselves may be different from one pair of measurements to the next.

As can be seen in this embodiment, since there is only one measurement channel comprising the low pass filter 29 and the analogue-to-digital converter 30, there is no requirement for accurate gain and phase matching of two filters and analogue-to-digital converters. Since all measurements are carried out using a single measurement channel, all measurements are equally affected by the characteristics of the measurement channel and thus in the calculations these factors cancel out.

Thus measurements are provided to the processor in successive blocks of the voltage $v_s$ on one side of the load resistor 21 which comprises the voltage applied across the device 20. The other voltage measurement obtained is the voltage $v_o$ on the drive side of the load resistor 21.

In the embodiment of FIG. 2 the load resistance 21 is provided to enable the determination of the current flowing through the device 20. The complex amplitude of the current can be calculated using Ohm's law as follows:

$$I = \frac{V_o - V_s}{R}$$

where $V_o$ and $V_s$ are the complex amplitudes at some frequency of $v_o$ and $v_s$.

The impedance of device 20 at this frequency is given by:

$$Z = V_s/I$$

Therefore:

$$Z = \frac{V_s R}{V_o - V_s}$$

It can be seen from this equation that impedance can be calculated from the ratio of the two complex voltage amplitudes taking into consideration the load resistance. In other words the value of the impedance is dependent upon the ratio of the voltage across the device and the voltage difference across the load resistance 21.

In one embodiment of the present invention the sequential measurements can be used to calculate the impedance. To detect a change of impedance, or in the case of the device being a proximity sensor, to detect the proximity of a target, the impedance value can be compared with a threshold impedance value to determine the proximity of a target to the sensor.

Such embodiments to the present invention, which involve the calculation of the impedance, however, require for a computationally expensive division operation to be carried out. Such divisions, also can result in out of range results e.g. a divide by zero operation which can be caused by noise.

A preferred embodiment of the present invention does not result in the calculation of an absolute value for impedance. Instead quantities derived from the $V_s$ and the $V_o-V_s$ are compared to identify a change in the relative values. This can be used to compare the relative values with a threshold.

The explanation of the operation of the measurement and processing is complicated by the fact that the drive signal generation and processing is performed digitally and the measurements comprise complex values for the voltage including phase and amplitude information. Also, impedance is complex:

$$Z = R + j\omega L$$

In this simplified embodiment, the output drive signal comprises a sinusoidal signal at a predetermined angular frequency $\omega$. Samples of this signal will be clocked out of the digital-to-analogue converter at a sample frequency $f_s = 1/\tau$, where $\tau$ is the sample period. Each block of the samples can be denoted by:

$$v_{on} = \text{real}(V_o z^n) \text{ for } n = -P \text{ to } M-1$$

where $z = e^{j\omega\tau}$, $V_o$ is the complex amplitude of the output voltage, P is a positive integer or zero indicating the number of samples of the block which may be zeroed to allow for settling, and M is a positive integer.

Normally there is no point in choosing $V_o$ to be anything other than 1 since the units of the signal are arbitrary and there is no point in requiring a complex multiplication to be performed as each output sample is generated. Typically therefore only the real part of $z^n$ is needed to generate the output These values are calculated and stored in the EEPROM memory 25 or program memory 24 beforehand, or they can be precomputed and stored in the RAM 26.

There may be occasions when the phase of the output drive signal is desired to be varied from one pair of blocks to another pair of blocks to help decorrelate it from an otherwise phase-locked interfering signal (such as cross-talk from another sensing system running at precisely the same frequency). In this case, both the real and imaginary components of $z^n$ will preferably be pre-calculated and stored so that an output of arbitrary initial phase can be generated.

Due to periodicities and symmetries in the output sequence, it is possible to store fewer than P+M values of $z^n$ and still be able to generate the entire output sequence without any additional arithmetic operations. The storage of such a partial representation of the generated waveform reduces the memory requirement.

As the output sequence is generated by the processor 23, one of the continuous-time input signals v(t) is synchronously sampled to yield a sequence of input samples, $v_n$ for n=0 to M−1, (where the first P samples of the block have been discarded or not measured to allow for settling). Each sample is then multiplied by $z^{-n}$ i.e $e^{-j\omega t}$ (a phase inverse of the complex generated signal of which the generated sinusoidal signal is a part). The digitised values $z^{-n}$ for $e^{-j\omega t}$ are stored in the EEPROM 25 (or program memory 24 or RAM 26) to avoid the need to calculate them in real time. The result is the weighted sequence which is summed over the M terms to yield an estimate of the complex amplitude V of the signal at angular frequency ω. This can be represented as:

$$v(t) = \text{real}(V(\omega)e^{j\omega t}) + \sigma(t)$$

where σ denotes any components in the signal that are not desired (e.g. noise), then $$v_n = \text{real}(V(\omega)z^n) + \sigma_R \text{ and}$$

$$\sum_0^{M-1} v_n z^{-n} = \frac{MV}{2} + \frac{1}{2}\sum_0^{M-1} V^* z^{-2R} + \sum_0^{M-1} \sigma_n z^{-n},$$

The second term on the right hand side is oscillatory with M, and therefore loses significance relative to the first term if M is large. The third term on the right hand side can also be neglected for large enough M provided the "noise" is uncorrelated with the output drive signal. It is particularly advantageous if $f_s$ be chosen such that $$f_s = \frac{N\omega}{2\pi}$$

where N is a positive integer, and M is chosen such that M=pN, where p is also a positive integer. In this special case, the second term on the right hand side above is zero. In any case, the estimate of V, denoted $\hat{V}$, is given by $$\frac{M\hat{V}}{2} = \sum_0^{M-1} v_n z^{-R}$$

This requires just two multiplications and additions at each sample point, and is therefore extremely economical on processing power. A basic microcontroller can manage this with less than 10% of its processing ability at useful sample rates.

In systems with more than one sinusoid component in the output drive signal, it is particularly advantageous if the frequencies of those components each obey the relation:

$$\omega_p = 2\pi f_s \frac{P}{M}$$

$$0 \le p \le \frac{M}{2}$$

where p is a positive integer, and $\omega_p$ is the angular frequency of the $p^{th}$ component.

In this case, whole cycles of each of the components fit within the M samples that are used in the calculation of the estimates of the complex voltage amplitudes. These estimates are calculated in a way analogous to that used for a single frequency system, viz.

$$\frac{M\hat{V}_p}{2} = \sum_0^{M-1} v_n z_p^{-n}$$

where $\hat{V}_p$ is the complex amplitude of the voltage component at angular frequency $\omega_p$ and $z_p = e^{j\omega_p \tau}$. If there is a special relationship among the excitation frequencies of a multi-frequency system, it is often possible to avoid storing a complete set of the weights $z_p^n$ for each frequency component because many of the weights will be common to more than one component. For example if p=1, 2 in a two-frequency system, at most only the weights $z_1^n$ (n=0 to M−1) need be stored, as the weights $z_2^n$ are already contained within, and can be picked out of the $z_1^n$.

A window function can be applied to a sample block in order to reduce windowing effects. The window function can easily be incorporated by modifying the weights $z^{-n}$ with the window weight (say $w_n$) and pre-storing the result $w_n z^{-n}$ in the EEPROM 25. Such window functions are well known in the art. This can mean that some additional storage is required for the modified weights, but no additional arithmetic operations are needed to form the estimate of V. Alternatively the values stored for the signal samples can be a combination of $z^{-n}$ and the window weights to avoid the need for additional storage and pre-calculation at run time. The window function can also overcome start-up transients by including leading zeros.

Another method of estimating V would be to low-pass filter the weighted input sequence. This is really just another form of averaging, and could be performed by e.g. convolving the weighted sequence with the impulse response of the chosen filter. Alternatively, the unweighted input sequence could be convolved with the impulse response of a band-pass filter with its pass-band centred substantially at an angular frequency of ω. These alternatives will require more computation and storage, however. Both of these alternatives could also be implemented "in the frequency-domain", in which case a Fast Fourier Transform (FFT) of the weighted or unweighted input sequence is typically taken prior to modifying it by the transfer function of the chosen filter. (In these cases, M will normally be chosen to be a power of 2). These alternatives also require more computation. These alternatives are also applicable to signals containing more than one frequency component.

The above process, applied to the two consecutively measured input signals (or "block-pair"), will yield $$\frac{M\hat{V}_S}{2} \equiv \hat{A}_S, \text{ say, and } \frac{M\hat{V}_o}{2} \equiv \hat{A}_o$$

where $V_S$ and $V_o$ are the complex voltage amplitude estimates measured by the system at the device 20 and at the output of the amplifier 22 respectively (i.e. at either end of the load resistor 21). The difference value is then calculated using $\hat{A}_R = \hat{A}_o - \hat{A}_S$. Cross- and auto-power spectral estimators are then formed as $$\hat{S}_{RS} = \hat{A}_S \hat{A}^*_R$$

and $$\hat{S}_{RR} = \hat{A}_R \hat{A}^*_R.$$

where $\hat{A}^*_R$ is the complex conjugate of $\hat{A}_R$. These quantities can be further averaged (e.g. over several block-pairs) if their variances are desired to be reduced.

It should be noted that the multiplication of the complex first and second parameters $\hat{A}_R$ and $\hat{A}_S$ by $\hat{A}^*_R$ causes the product $\hat{A}_R \hat{A}^*_R$ to be generated, which is real. This facilitates the comparison of the third and fourth parameters $\hat{S}_{RS}$ and $\hat{S}_{RR}$, and avoids the need to perform computationally complex division of the parameters since it facilitates a threshold comparison. Also, this facilitates the averaging of measurements or parameters.

The thresholding of the results, in order to identify a threshold change in impedance can be summarized as the determination of any one of the following:

real($\hat{S}_{RS}$)>H$\hat{S}_{RR}$? (threshold on the linear resistive part of the impedance)

imag($\hat{S}_{RS}$)>H$\hat{S}_{RR}$? (threshold on the linear reactive part of the impedance)

or abs($\hat{S}_{RS}$)>H$\hat{S}_{RR}$? (threshold on the magnitude of the linear part of the impedance) (or, equivalently, $\hat{S}_{RS}\hat{S}^*_{RS}$>H$\hat{S}_{RR}^2$?), or more generally, real($\hat{S}_{RS}e^{j\phi}$)>H$\hat{S}_{RR}$? Etc. where φ is a quantity selected by the designer or derived as part of the processing or even more generally, $G_r$(real($\hat{S}_{RS}e^{j\phi}$))+$G_i$(imag($\hat{S}_{RS}e^{j\phi}$))>H$\hat{S}_{RR}$? where $G_r$ and $G_i$ are arbitrary real functions selected by the designer or derived by the processing.

The above formulae can also be generalised to use an impedance measure derived from 2 different frequency measurements. This would take the form given below in one example $$\text{imag}(\alpha\hat{S}_{RS}(\omega_1)\hat{S}_{RR}(\omega_2)+\beta\hat{S}_{RS}(\omega_2)\hat{S}_{RR}(\omega_1))>H\hat{S}_{RR}(\omega_2)?$$

(this is a threshold on the linear reactive part of the weighted impedance measure), where $\omega_1$ and $\omega_2$ indicate measurements at 2 frequencies and α and β are constants determining the weight applied to the measurements at frequency 1 and 2. This type of weighted sum comparison can obviously be generalized to the other types of thresholding listed above. The values α, β=±1 are particularly useful for forming measures of sums or differences of components of impedance at different frequencies for comparison with a threshold. This type of weighted sum can also be generalized to more than 2 frequencies without difficulty.

In the above embodiments the "$H_1$" transfer function is used. However as an alternative the "$H_2$" transfer function could be used and will give rise to the inequalities:

$\hat{S}_{SS}$real($\hat{S}^*_{SR}$)>H$\hat{S}^*_{SR}\hat{S}_{SR}$? (threshold on the linear resistive part of the impedance)

$\hat{S}_{SS}$imag($\hat{S}^*_{SR}$)>H$\hat{S}^*_{SR}\hat{S}_{SR}$? (threshold on the linear reactive (inductive) part of the impedance)

$\hat{S}^*_{SS}\hat{S}_{SS}$>H$\hat{S}^*_{SR}\hat{S}_{SR}$? (threshold on the magnitude of the linear part of the impedance) or more generally, $\hat{S}_{SS}$real($\hat{S}^*_{SR}e^{j\phi}$)>H$\hat{S}^*_{SR}\hat{S}_{SR}$? Etc. where φ is some constant chosen by the designer or derived by the process where $\hat{S}_{SS}=\hat{A}_S\hat{A}^*_S$ and $\hat{S}_{SR}=\hat{S}^*_{RS}$.

In setting the above thresholds, H will contain numerical constants relating to the system and the processing that can be pre-calculated and will not vary from one set of electronics to another. It will also contain the precise value (or its reciprocal) of the load resistance, which is stored in the EEPROM 25 (or other memory) following a calibration process or end-of-line test.

It is clear from the above that in order to identify whether a change in impedance (or at least one component of it) is above or below a threshold its actual value need not be computed and compared to a threshold. Instead, the relative values of two parameters related to the current and the voltage in the device can be compared to determine if their relationship is above or below a threshold.

In one embodiment hysteresis is added into the comparison in order to avoid 'hunting' when the impedance (or at least one component of it) fluctuates close to the threshold. Accordingly the threshold can be dependant upon the current state i.e. whether the quantity related to the current impedance (or at least one component of it) is above or below the threshold. In order for the system to generate an output the inequality is adjusted either by adjusting H or by adding a factor into either side of the inequality. Thus if the quantity related to the impedance component was above the threshold for a previous measurement, for example real($\hat{S}_{RS}$)>H$\hat{S}_{RR}$, the effective threshold is made smaller either by reducing H or by adding a factor to the left hand side of the inequality (or subtracting a factor from the right hand side of the inequality). Similarly if the quantity related to the impedance was below the threshold for a previous measurement, for example real ($\hat{S}_{RS}$)≦H$\hat{S}_{RR}$, the effective threshold is made bigger either by increasing H or by adding a factor to the right hand side of the inequality (or subtracting a factor from the left hand side of the inequality).

A second embodiment of the present invention will now be described with reference to FIG. 3. This embodiment is similar to the first embodiment illustrate in FIG. 2 (and hence like reference numerals have been used for like components) except that the measures voltages are $v_S$ and $v_R$ where $v_R$ is the difference between the voltages $v_o$ and $v_s$ as provided by an analogue difference amplifier 72.

In this embodiment the processing, applied to the two consecutively measured input signals (or "block-pair"), will yield $$\frac{M\hat{V}_S}{2} \equiv \hat{A}_S \text{ and } \frac{M\hat{V}_R}{2} \equiv \hat{A}_R$$

where $\hat{V}_S$ and $\hat{V}_R$ are the complex voltage amplitude estimates measured by the system at the device 20 and at the output of the difference amplifier 72 respectively, Cross- and auto-power spectral estimators are then formed as in the first embodiment.

This embodiment benefits from the avoidance of the need to calculate the difference voltage parameter $\hat{A}_R$ from $\hat{A}_S$ and $\hat{A}_o$. However a difference amplifier is required which is highly accurate and stable.

A third embodiment of the present invention will now be described with reference to FIG. 4. This embodiment is similar to the first embodiment of the present invention illustrated in FIG. 2 and hence like reference numerals are used for like components. This embodiment differs from the first embodiment in that multiple measurement channels are provided for simultaneous measurement of the voltages sequentially. In this embodiment there are two channels operating so that at any point in time a measurement of both voltages $v_o$ and $v_s$ is being taken simultaneously. Each measurement channel includes a low pass filter 49 or 50. In this embodiment the measurement channels share an analogue-to-digital converter 30 by the use of a multiplexer 51 to multiplex the signals via the ADC into the processor 23. This embodiment is suited to systems in which P=0, all of the input sample block-pairs are either the same or varying only slowly in time, and the blocks are output consecutively with no quiescent period between them. It still has the advantage that accurate matching of the measurement channels is not required.

In an alternative embodiment each measurement channel could have its own analogue-to-digital converter. Also, although this embodiment illustrates the use of two simultaneous measurement channels, the present invention encompasses any number. The number is limited only by the number of samples in each block. At the limit, each of a plurality of 2M channels could provide simultaneous measurements sequentially starting at each sample point of the M samples per block so that the channels measure the voltages one cyclically sample point out of phase.

Each measurement channel provides sequential measurements of the voltages. Each channel allows the processor to generate a result every second block after an initial delay of two blocks. In the embodiment illustrated in FIG. 4 the use of two channels enables the processor to produce a result every block. In the extreme, where there are 2M channels, the processor could produce a result every sample point.

In the case of two channels, during samples 0 to M−1 channel 1 will be switched to sample $v_o$ for example and during samples M and 2M−1, it will be switched to measuring $v_s$, and so on alternately. Whereas, channel 2 will be switched to measure $v_o$ during samples M to 2M−1, and during samples 2M to 3M−1 it will be switched to measure $v_s$, and so on alternately. By computing results for consecutive block-pairs, this enables results to be available from channel 1 at times $(2M-1)\tau$, $(4M-1)\tau$ etc, whereas results are available from channel 2 at interleaved times $(3M-1)\tau$, $(5M-1)\tau$ etc. This can be extended to more channels in the same manner.

In the limiting case of 2M measurement channels, each pair of channels begins its acquisition of its block-pairs one sample delayed from the previous pair of channels. One of the pair will begin by measuring a block of $v_o$, and the other will measure $v_s$. This enables, after an initial delay of one block-pair, results taken across all of the channels to be available every sample point.

Evenly spaced results (in time) are generated for multiple channels if the number of channels is 2 times a factor (or the product of factors) of M.

In this embodiment, in order to improve the accuracy of the processed result, the processor can perform an averaging operation on the measurements from the multiple channels. The averaging can be of the parameters $\hat{A}_S$ and $\hat{A}_o$, or $\hat{A}_S$ and $\hat{A}_R$ for example.

The embodiments of the present invention are suited to use with proximity sensors. The design can use a separate microprocessor for each sensor. This is economically viable because the processor can be very simple and cheap. It also means that the system is highly modular, and failures in one sensor channel are unlikely to affect another sensor channel (because the channels are effectively self-contained). However, it is possible to combine more than one sensor channel with a single, more powerful, processor yet still use the sequential measurement technique and economical processing method to simplify the system and reduce its cost.

Since the designer can choose the excitation frequencies, it is possible to ensure that they are not close to other significant sources of interference (such as harmonics of an alternating current (ac) power line frequency).

Where crosstalk from one sensor system to another is unavoidable, it is preferable for each system to be operating at a different set of frequencies. This may not be possible, however, as there is an incentive to make all systems the same. In this case, the frequencies of each system can be made to change in such a way that one system's excitation will be decorrelated from another's (a random variation of the excitation frequencies from block-pair to block-pair within some bounded range would achieve this, for example). Alternatively, the frequencies can be kept fixed and the phases of the excitation blocks can be changed from block-pair to block-pair.

Where interfering noise is thought to be a problem, the number of samples in each data block, M, can be increased. This is at the cost of a slower response to changes in the sensor-target separation. M could be adaptively varied in response to some estimate of the level of background noise. An alternative (or complement) to varying M is to form the cross- and auto-power spectral estimates from the averages of more than one set of consecutive data block-pairs. This has the same effect of improving the noise immunity at the cost of a slower response to sensor-target separation, The number of averages chosen could be adaptively varied in response to some estimate of the level of background noise. A useful estimate of the background noise could be derived from the coherence, $\gamma_{RS}^2$ given by $$\gamma_{RS}^2 = \frac{|\overline{\hat{S}_{RS}}|^2}{\overline{\hat{S}_{RR}}\,\overline{\hat{S}_{SS}}}$$

although in practice, $|\overline{\hat{S}_{RS}}|^2$ would be compared to $\overline{\hat{S}_{RR}}\,\overline{\hat{S}_{SS}}$ without performing the computationally expensive division. The averages (indicated by an over bar) are taken over more than one data block-pair. This would normally be performed as a "running average" over a chosen number of data block-pairs. The coherence will be close to unity if the noise is low, and tends to zero as the noise increases. The only additional quantity that has to be computed is $$\hat{S}_{SS} = \hat{A}_S \hat{A}^*_S.$$

An adaptive scheme might vary M and/or the number of averages of the cross- and auto-power spectral estimates in order to keep the coherence at around some threshold value, such as 0.95.

In the above method a modulus is required. An alternative method comprises using the equation:

$$\gamma_{RS}^2 = \frac{\overline{\hat{S}_{RS}}\,\overline{\hat{S}_{RS}^*}}{\overline{\hat{S}_{RR}}\,\overline{\hat{S}_{SS}}}.$$

This avoids the need for the modulus operation. The comparison to avoid division can then be carried out by determining if:

$$\gamma_{RS}^2 > \gamma_{threshold}^2$$

i.e. whether $$\overline{\hat{S}^*_{RS}}\,\overline{\hat{S}_{RS}} > \gamma_{threshold}^2\,\overline{\hat{S}_{RR}}\,\overline{\hat{S}_{SS}}.$$

In some systems, large, sudden and short duration noise is present (this would be typified by a lightning strike, for example). Where a running estimate of the coherence is being maintained, the consequent sudden drop in coherence can be used as an indicator that a false "near/far" indication may be given. It is then possible to e.g. hold the previous state until the coherence regains an acceptable level. This helps to avoid false indications during periods of strong intermittent noise.

An alternative approach to estimating the noise on the signals is to compare the total magnitude of the signal with its extracted complex amplitude. So, for example, one could compare $$\left(\sum_{0}^{M-1} v_n^2 - \sum_{J}^{K} \left|\frac{M\hat{V}_k}{2}\right|^2\right) \text{ to } \left|\frac{M\hat{V}_k}{2}\right|^2,$$

when the excitation contains K sinusoids at different frequencies, to decide if the signal at frequency $\omega_k$ is sufficiently large compared to all of the other (non-system related) noise on the signal. If it is not, and nor are any of the other excitation components, then one might choose to ignore the "near/far" indication given and hold a previous value. This type of comparison is prone to false alarms, however, because the process of extracting the complex amplitudes at the excitation frequencies is highly frequency-selective, so even large amounts of noise in the signal at other frequencies may have little effect on the accuracy of the "near/far" indication. It may, however, still be a useful technique for catastrophic events, such as a lightning strike. Again, a "running average" of the above comparison over more than one data block-pair could be maintained, and the trend in this average used to diagnose sudden increases in noise.

A "diagnostic" signal could be generated by the system for output to other systems when excessive noise interference is detected by either of the above general techniques.

One embodiment of the present invention provides a method of calibrating a measurement system as described above with reference to any one of FIGS. 1 to 4. In the prior art, the measurement system requires the use of an accurately known load resistance 2. The processing is then performed on the measurements assuming the known resistance. In this embodiment of the present invention, the measurement system does not rely on the use of a known stable load resistance R. Instead a stable resistance can be used the value of which is not initially accurately known but which is measured and stored in the processing system for use during measurements.

The method comprises using a test resistance $R_t$ of accurately known value in place of the device and taking voltage measurements. In the prior art system of FIG. 1, the value of R could be calculated from:

$$R = \frac{R_t(v_a - v_s)}{v_s}$$

Figure 3:
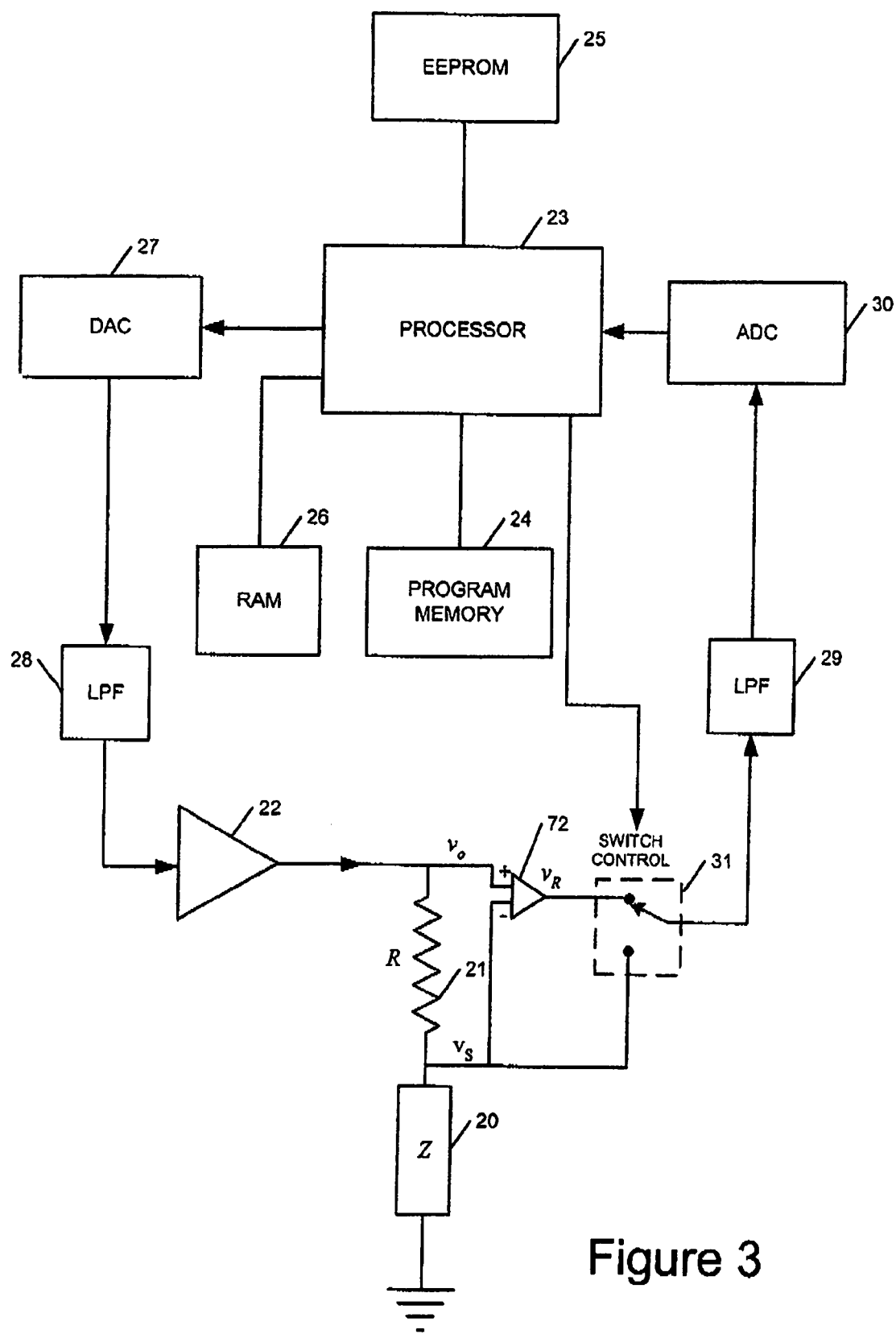
FIG. 3 is a schematic diagram of a measurement and processing system in accordance with a second embodiment of the present invention.
Figure 4:
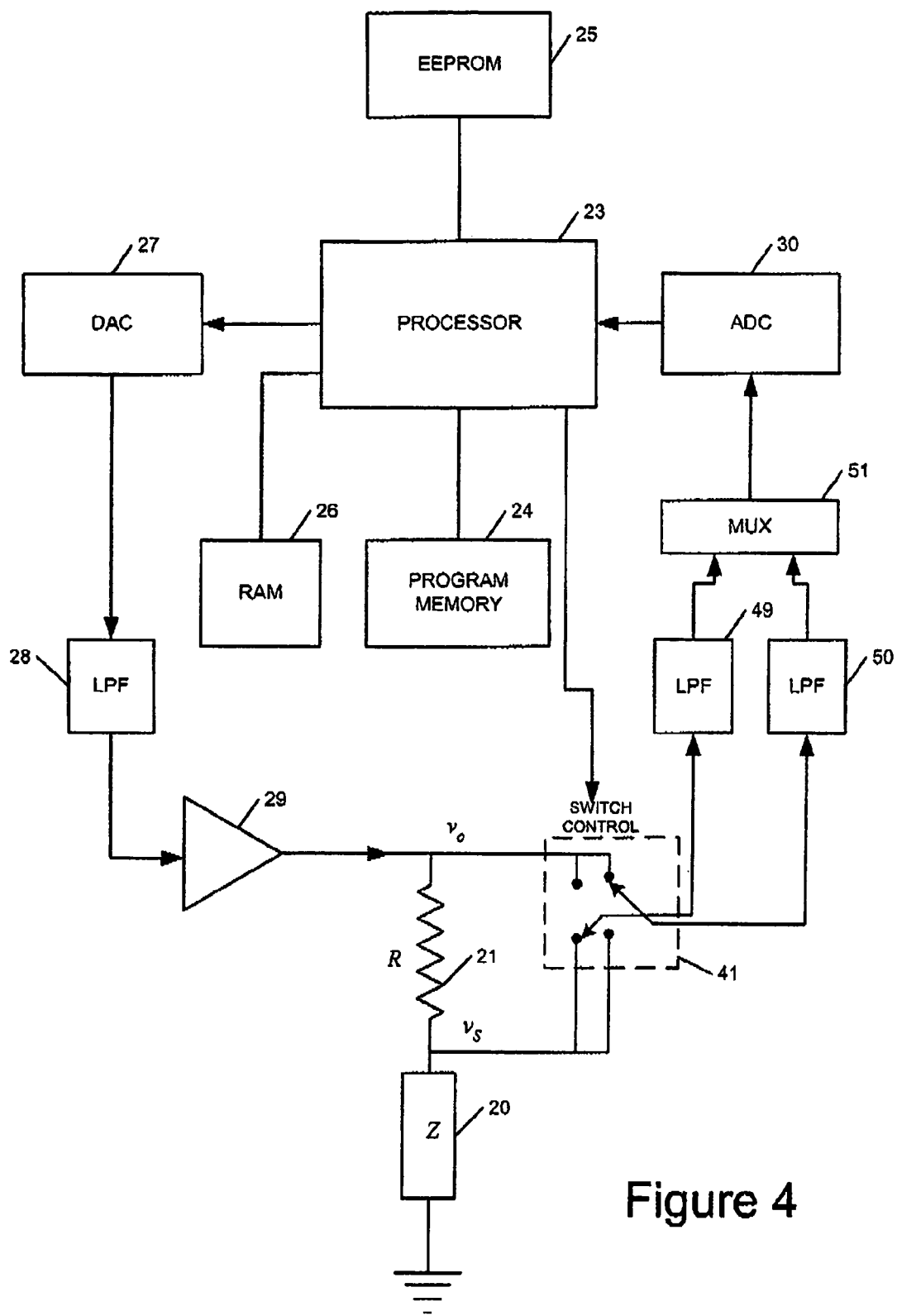
FIG. 4 is a schematic diagram of a measurement and processing system in accordance with a third embodiment of the present invention.

In the systems of FIGS. 2, 3, and 4, however, R would typically be estimated using similar methods to those used in normal operation with a device connected in place of the test component viz.

$$R = R_t \frac{\hat{S}_{RR}}{\hat{S}_{RS}}$$

The computation of R and derived values can be performed in the test equipment if desired, and the results stored in the processor memory.

There is no necessity for the load component or the test component to be purely resistive, provided the impedance of the test component is known, and the impedance of the load component is stable. However, it is convenient to make both components pure resistors so that their impedances are frequency-independent. Embodiments with load components that are not pure resistors can easily be derived from the above embodiments in which a purely resistive component is used.

The value for R (or the reciprocal of R or a derived quantity) is stored in the processor memory e.g. the EEPROM of FIGS. 2 to 4 for use in the calculation of the impedance or at least one component of impedance of the device using prior art processing techniques, or for use in the calculation of the comparison as described hereinabove.

Thus this embodiment of the present invention provides a methodology, which avoids the expensive component costs required in the use of stable and precisely manufacturer-characterised resistors as the load resistance in the measurement system.

Figure 5:
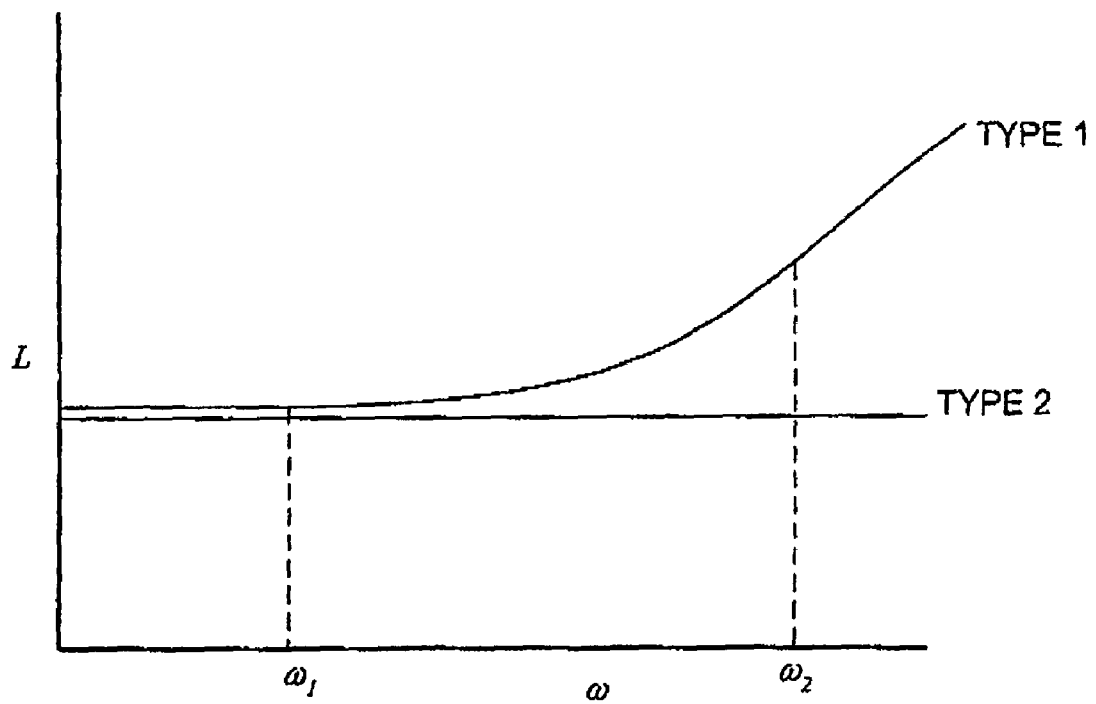
FIG. 5 is a diagram illustrating a graph of the impedance characteristics with frequency of two types of devices.

A further embodiment of the present invention provides a method of identifying devices when devices have different permeability or resistivity as a function of frequency. Such a variation is illustrated in FIG. 5. The devices may have different core materials that may need different temperature compensation The differing core materials may have differing permeability as a function of frequency. To make use of differing frequency dependencies of the impedance with frequency for the 2 device types, current and voltage measurements are taken at one or more additional frequencies to the basic frequency needed for the impedance (or at least one component thereof) change determination.

Impedance estimates at frequencies $\omega_1$ and $\omega_2$ are obtained. This gives a test inequality of the form:

$$|Z(\omega_1)|^2 > k|Z(\omega_2)|^2?$$

for a test based on the magnitudes of the impedances at the two frequencies. This is comparable to $$\hat{S}_{RS}(\omega_1)\hat{S}*_{RS}(\omega_1)\hat{S}_{RR}^2(\omega_2) > k\hat{S}_{RS}(\omega_2)\hat{S}_{RS}(\omega_2)\hat{S}_{RR}^2(\omega_1)?$$

or $$V_S(\omega_1)V*_S(\omega_1)V_R(\omega_2)V*_R(\omega_2) > kV_S(\omega_2)V*_S(\omega_2)V_R(\omega_1)V*_R(\omega_1)?$$

for a prior art system in which the load component is a resistor and $v_r = v_o - v_s$.

Similarly, for a test based on the real part of the impedance of the device, $$\text{real}(\hat{S}_{RS}(\omega_1))\hat{S}_{RR}(\omega_2) > k\,\text{real}(\hat{S}_{RS}(\omega_2))\hat{S}_{RR}(\omega_1)?$$

or $$\text{real}(V_S(\omega_1)V*_R(\omega_1))V_R(\omega_2)V*_R(\omega_2) > k\,\text{real}(V_S(\omega_2)V*_R(\omega_2))V_R(\omega_1)V*_R(\omega_1)?$$

For a test based on the imaginary part of the impedance of the device $$\text{imag}(\hat{S}_{RS}(\omega_1))\hat{S}_{RR}(\omega_2) > k\,\text{imag}(\hat{S}_{RS}(\omega_2))\hat{S}_{RR}(\omega_1)?$$

or $$\text{imag}(V_S(\omega_1)V*_R(\omega_1))V_R(\omega_2)V*_R(\omega_2) > k\,\text{imag}(V_S(\omega_2)V*_R(\omega_2))V_R(\omega_1)V*_R(\omega_1)?$$

Thus this enables the type of device, i.e. a device or group of devices having the same characteristics, to be determined from its impedance characteristics by comparing the measurements at two frequencies, if the value of k is set at a value that allows the distinction between type 1 and type 2 devices. The identification of a device type from a plurality of device types can be achieved by repeating this method for pairs of device types.

A further refinement of the above comparisons can be made when identification of a device from a group of devices is to be based on a measure of the eddy-current "resistance" of the device. In this case, measurements are made at a low frequency $\omega_1$ where the eddy-current effects are small, and another, higher frequency $\omega_2$. Since the resistive components not due to eddy currents are sensibly constant with frequency, a decision based on the difference between the resistive part of the impedance measures at $\omega_2$ and $\omega_1$ is comparable a decision based on the eddy-current "resistance" of the device. In practice, this comparison is preferably performed by $$\text{real}(-\hat{S}_{RS}(\omega_1)\hat{S}_{RR}(\omega_2)+\hat{S}_{RS}(\omega_2)\hat{S}_{RR}(\omega_1))>H\hat{S}_{RR}(\omega_1)\hat{S}_{RR}(\omega_2)?$$

In any embodiment of the present invention described hereinabove, the processor can be programmed to identify a fault in the device i.e. to carry out diagnostics for the device. For example, if the processor detects that the voltage $v_o$ has gone low, this indicates that the digital-to-analogue converter is damaged, If the voltage $v_s$ goes low, this indicates that the device has gone short circuit. If $v_o \approx v_s$ this indicates that the device has gone open circuit. The processor can detect these types of faults and can generate an output that can be used to give a warning. This technique is equally applicable to prior art systems. In this embodiment, if the load component goes open circuit $v_s$ goes very low. Also if the device goes short circuit, $v_s$ goes very low.

In one embodiment, in order to detect if the load component has gone open circuit, a small resistor of know resistance can be placed in series with the load component between the load component and the device. The measurement $v_s$ being taken between the additional resistor and the device and the measurement $v_o$ being taken at the end of the load component remote from the additional resistor. In this embodiment when the load component goes open circuit, $v_s$ goes very low. If the device goes short circuit, $v_s$ goes low but not very low. Thus using the additional resistor enables the two states to be distinguished. To avoid the problem of the additional resistor going open circuit, a third measurement could be taken between the additional resistor and the load component.

The identification of a device or device type is useful where the devices are used for applications where they can be used interchangeably and it is desirable to use the same electronic processing circuit e.g. where the device may be replaced in use with a device of another type having different characteristics. In such a scenario it is important that the electronics detect that the device type has changed and use appropriate calculations to generate the proper output e.g. a proximity detection output. In the embodiments described above, the detection of the device type enables the proper threshold values H to be chosen for use with the device type.

Although embodiments of the present invention have been described with reference to inductive devices, the present invention also applied to capacitance devices since the imaginary part of impedance (the reactive part) is dependant upon inductance or the inverse of capacitance. Such variable capacitive devices, such as variable capacitance proximity sensors are well known in the art.

Although the present invention has been described with reference to specific embodiments, it will be apparent to a skilled person in the art that modifications lie within the spirit and scope of the present invention.

What is claimed is:

1. Apparatus for generating an output dependent upon the impedance or at least one component of the impedance of a device, the apparatus comprising:
    a load component having a known impedance or at least one component thereof for connection in series with said device;
    a signal generating arrangement for generating a time-varying electrical signal for application to the series connected load component and device;
    a measurement channel for measuring voltages;
    a switch arrangement connected to said measurement channel for switching the measurement channel to sequentially measure a first voltage on a first side of said load component, and a voltage difference between said first side and a second side of said load component; and
    a processing arrangement connected to said measurement channel for processing the sequentially measured voltages to generate an output dependent upon said impedance or said at least one component of impedance of said device.

2. Apparatus according to claim 1, wherein said signal generating arrangement is adapted to generate said signal comprising sequential signal blocks for application to said series connected load component and device, wherein said switch arrangement is adapted to switch said measurement channel to measure each of said voltages during the same part of the signal block of sequential signal blocks of said signal.

3. Apparatus according to claim 2, wherein said signal generating arrangement includes a digital store storing a signal pattern for at least a part of a said signal block, generator means for generating a digital signal by repeatedly using the stored signal pattern, and a digital-to-analogue converter for converting the digital signal to the signal.

4. Apparatus according to claim 3, wherein said signal generating arrangement and said processing arrangement are adapted to operate synchronously.

5. Apparatus according to claim 1, including a plurality of said measurement channels for measuring said voltages, wherein said switching arrangement is adapted to switch each of said measurement channels to sequentially measure said voltages to allow simultaneous measurements in the measurement channels, and said processing arrangement is adapted to process the sequentially measured voltages for each channel.

6. Apparatus according to claim 5, wherein said processing arrangement comprises a digital processing arrangement, and said measurement channels include a common multiplexer arrangement and a common analogue-to-digital converter.

7. Apparatus according to claim 1, wherein said processing arrangement is adapted to generate the output as a measure of impedance or at least one component of the impedance of said device.

8. Apparatus for generating an output dependent upon the impedance or at least one component of the impedance of a device, the apparatus comprising:
    a load component having a known impedance or at least one component thereof for connection in series with said device;
    a signal generating arrangement for generating a time-varying electrical signal for application to the series connected load component and device;
    a measurement channel for measuring voltages;
    a switch arrangement connected to said measurement channel for switching the measurement channel to sequentially measure a first voltage on a first side of said load component, and one of a second voltage on a second side of said load component or a voltage difference between said first side and a second side of said load component; and
    a processing arrangement connected to said measurement channel for processing the sequentially measured voltages to generate an output dependent upon said impedance or said at least one component of impedance of said device;

wherein said processing arrangement is adapted to generate said output as an indication of whether or not a factor related to the impedance or at least one component thereof is above or below a threshold without determining an absolute measure of impedance.

9. Apparatus according to claim 8, wherein said processing arrangement is adapted to:
determine a first parameter indicative of the complex amplitude of the first voltage on a first side of said load component connected to said device, and a second parameter indicative of the complex amplitude of the difference between the first and second voltages or said voltage difference;
multiply each of the first and second determined parameters by the complex conjugate of the second determined parameter to generate third and fourth parameters respectively; and
compare said third and fourth parameters to generate said output, or compare one or more components or derivatives of the third parameter and one or more components or derivatives of said fourth parameter to generate said output.

10. Apparatus according to claim 9, wherein said processing arrangement is adapted to include an averaging process in the generation of said third and fourth parameters.

11. Apparatus according to claim 9, wherein said processing arrangement is adapted to multiply said first voltage measurement by a factor based on a phase inverse of a complex signal of which the generated signal is a part to determine said first parameter, to multiply said second voltage measurement by said factor to determine an interim parameter, and to subtract said first parameter from said interim parameter to determine said second parameter.

12. Apparatus according to claim 11, wherein said measurement channel includes an analogue-to-digital converter for generating digital voltage measurements from said voltage measurements, and said processing arrangement is adapted to multiply each voltage measurement by said factor and to sum each of the digital voltage measurements multiplied by said factor over a plurality of digital samples.

13. Apparatus according to claim 9, wherein said processing arrangement is adapted to multiply said first voltage measurement by a factor based on a phase inverse of a complex signal of which the generated signal is a part to determine said first parameter, to determine a difference voltage using said first and second voltage measurements, and to multiply said difference voltage by said factor to determine said second parameter.

14. Apparatus according to claim 9, wherein said processing arrangement is adapted to multiply said first voltage measurement by a factor based on a phase inverse of a complex signal of which the generated electrical signal is a part to determine said first parameter, and to multiply said voltage difference measurement by said factor to determine said second parameter.

15. Apparatus according to claim 9, wherein said processing arrangement is adapted to compare said third and fourth parameters using a constant, wherein said constant is dependent upon an impedance or at least one component of impedance of said load component.

16. Apparatus according to claim 15, wherein said processing arrangement is adapted to compare said third and fourth parameters to generate said output by comparing the result of multiplying each said fourth parameter by said constant with each said third parameter; wherein said constant includes the reciprocal of the impedance or part thereof of said load component.

17. Apparatus according to claim 9, wherein said processing arrangement is adapted to determine an estimate of noise in the measurements using averages of said third and fourth parameters over a plurality of measurements, and to ignore the current comparison of said third and fourth parameters if said noise is above a threshold.

18. Apparatus according to claim 8, wherein said signal generating arrangement is adapted to generate said electrical signal comprising a plurality of frequency components and said processing arrangement is adapted to determine a first parameter indicative of the complex amplitude of the first voltage on said first side of said load component for each said frequency, and a second parameter indicative of the complex amplitude of the difference between the first and second voltages or said voltage difference for each said frequency, to multiply each of the first and second determined parameters by the complex conjugate of the second determined parameter to generate third and fourth parameters respectively, and to compare said third and fourth parameters to generate said output, or compare one or more components or derivatives of the third and fourth parameters to generate said output.

19. A method of generating an output dependent upon the impedance or at least one component of the impedance of a device, the method comprising:
connecting a load component having a known impedance or at least one component thereof in series with said device;
applying a time-varying electrical signal to the series connected load component and device;
using a measurement channel to sequentially measure a first voltage on a first side of said load component, and a voltage difference between said first side and a second side of said load component; and
processing the sequentially measured voltages to generate an output dependent upon said impedance or at least one component of the impedance of said device.

20. A method according to claim 19, wherein said signal is generated as a signal comprising sequential signal blocks for application to said series connected load component and device, wherein said measurement channel is used to measure each of said voltages during the same part of the signal block of sequential signal blocks of said signal.

21. A method according to claim 20, including storing a signal pattern for at least a part of a signal block, digitally generating a digital signal by repeatedly using the stored signal pattern, and digital-to-analogue converting the digital signal to generate the signal.

22. A method according to claim 19, wherein the signal generation and the processing are synchronous.

23. A method according to claim 19, including using a plurality of said measurement channels for measuring said voltages, using each of said measurement channels to sequentially measure said voltages to allow simultaneous measurements in the measurement channels, and processing the sequentially measured voltages for each channel.

24. A method according to claim 19, wherein said processing comprises digital processing, and said measurement channels include a common multiplexer arrangement and a common analogue-to-digital converter.

25. A method according to claim 19, wherein said processing generates the output as a measure of impedance or at least one component of the impedance of said device.

26. A method generating an output dependent upon the impedance or at least one component of the impedance of a device, the method comprising:

connecting a load component having a known impedance or at least one component thereof in series with said device;

applying a time-varying electrical signal to the series connected load component and device;

using a measurement channel to sequentially measure a first voltage on a first side of said load component, and one of a second voltage on a second side of said load component or a voltage difference between said first side and a second side of said load component; and processing the sequentially measured voltages to generate an output dependent upon said impedance or at least one component of the impedance of said device;

wherein the processing generates said output as an indication of whether or not a factor related to the impedance or at least one component of the impedance is above or below a threshold.

27. A method according to claim 26, wherein said electrical signal comprises a plurality of frequency components and said processing includes determining a first parameter indicative of the complex amplitude of the first voltage on said first side of said load component for each said frequency, and a second parameter indicative of the complex amplitude of the difference between the first and second voltages or said voltage difference for each said frequency, multiplying each of the first and second determined parameters by the complex conjugate of the second determined parameter to generate third and fourth parameters respectively, and comparing said third and fourth parameters to generate said output, or comparing one or more components or derivatives of the third and fourth parameters to generate said output.

28. A method according to claim 27, including repeating said determining step to determine a plurality of first and second parameters, repeating said multiplying step to generate a plurality of said third and fourth parameters, and averaging said third and fourth parameters, wherein said comparing step comprises comparing the averaged third and fourth parameters.

29. A method according to claim 19, wherein said processing includes determining a first parameter indicative of the complex amplitude of the first voltage on a first side of said load device connected to said device, and a second parameter indicative of the complex amplitude of a difference between the first and second voltages or said voltage difference;

multiplying each of the first and second determined parameters by the complex conjugate of the second determined parameter to generate third and fourth parameters respectively; and comparing said third and fourth parameters to generate said result.

30. A method according to claim 29, including repeating said determining step to determine a plurality of first and second parameters, repeating said multiplying step to generate a plurality of said third and fourth parameters, and averaging said third and fourth parameters, wherein said comparing step comprises comparing the averaged third and fourth parameters.

31. A method according to claim 29, wherein said signal is generated as a complex signal and a sinusoidal signal is derived from said signal for application to the series connected load component and device, said processing includes multiplying said first voltage measurement by a factor based on a phase inverse of the generated electrical signal to determine said first parameter, multiplying said second voltage measurement by a factor based on a phase inverse of the generated electrical signal to determine an interim parameter, and subtracting said first parameter from said interim parameter to determine said second parameter.

32. A method according to claim 29, wherein said processing includes multiplying said first voltage measurement by a factor based on a phase inverse of a complex signal of which the generated signal is a part to determine said first parameter, determining a difference voltage using said first and second voltage measurements, and multiplying said difference voltage by said factor to determine said second parameter.

33. A method according to any claim 29, wherein said processing includes multiplying said first voltage measurement by a factor based on a phase inverse of a complex signal of which the generated electrical signal is a part to determine said first parameter, and multiplying said voltage difference measurement by said factor to determine said second parameter.

34. A method according to claim 29, wherein said measurement channel includes an analogue-to-digital converter for generating digital voltage measurements from said voltage measurements, and said multiplying includes summing each of the digital voltage measurements multiplied by said factor over a plurality of digital samples.

35. A method according to claim 29, wherein said processing includes comparing said third and fourth parameters using a constant, wherein said constant is dependent upon an impedance or at least one component of the impedance of said load component.

36. A method according to claim 35, wherein said processing includes comparing said third and fourth parameters to generate said result by comparing the result of multiplying each said fourth parameter by said constant with each said third parameter; wherein said constant includes the reciprocal of the impedance or part thereof of said load component.

37. A method according to claim 29, wherein said processing includes determining an estimate of noise in the measurements using averages of said third and fourth parameters over a plurality of measurements, and ignoring the current comparison of said third and fourth parameters if said noise is above a threshold.

38. Apparatus for generating an output dependent upon the impedance or at least one component of the impedance of a device, the apparatus comprising:

a load component having a known impedance or at least one component thereof for connection in series with the device to allow for the measurement of a voltage drop across the load component;

a generator arrangement for applying a signal having a voltage to the series connected load component and device;

a measurement arrangement adapted to measure a first voltage one side of said load component, and one of a second voltage on the other side of said load component or a difference voltage comprising the voltage difference across said load device; and a signal processing arrangement for processing the measurements to generate an output dependent upon the impedance or at least one component of the impedance of the device, wherein said processing arrangement is adapted to:

determine a first parameter indicative of the complex amplitude of the first voltage on a first side of said load component connected to said device, and a second parameter indicative of the complex amplitude of said difference voltage or a calculated difference voltage comprising the difference between the first and second voltages;

multiply each of the first and second determined parameters by the complex conjugate of the second determined parameter to generate third and fourth parameters respectively; and compare said third and fourth parameters to generate an output or compare one or more components or derivatives of the third parameter and said fourth parameter to generate said output.

39. Apparatus according to claim 38, wherein said signal processing arrangement is adapted to include an averaging process in the generation of said third and fourth parameters.

40. Apparatus according to claim 38, wherein said signal processing arrangement is adapted to multiply said first voltage measurement by a factor based on a phase inverse of a complex signal of which the generated electrical signal is a part to determine said first parameter, to multiply said second voltage measurement by said factor to determine an interim parameter, and to subtract said first parameter from said interim parameter to determine said second parameter.

41. Apparatus according to claim 40, wherein said measurement channel includes an analogue-to-digital converter for generating digital voltage measurements from said voltage measurements, said signal processing arrangement is adapted to perform the multiplication of said measurement by said factor and to sum each of the digital voltage measurements multiplied by said factor over a plurality of digital samples.

42. Apparatus according to claim 38, wherein said signal processing arrangement is adapted to multiply said first voltage measurement by a factor based on a phase inverse of a complex signal of which the generated electrical signal is a part to determine said first parameter, to determine a voltage difference using said first and second voltage measurements, and to multiply said voltage difference by said factor to determine said second parameter.

43. Apparatus according to claim 38, wherein said processing arrangement is adapted to multiply said first voltage measurement by a factor based on a phase inverse of a complex signal of which the generated electrical signal is a part to determine said first parameter, to multiply said difference voltage measurement by said factor to determine said second parameter.

44. Apparatus according to claim 38, wherein said signal processing arrangement is adapted to generate said electrical signal comprising a plurality of frequency components and said processing arrangement is adapted to determine a first parameter indicative of the complex amplitude of the first voltage on said first side of said load component for each said frequency, and a second parameter indicative of the complex amplitude of the difference between the first and second voltages or said voltage difference for each said frequency, to multiply each of the first and second determined parameters by the complex conjugate of the second determined parameter to generate third and fourth parameters respectively, and to compare said third and fourth parameters to generate said output, or compare one or more components or derivatives of the third and fourth parameters to generate said output.

45. Apparatus according to claim 38, wherein said signal processing arrangement is adapted to compare said third and fourth parameters using a constant, wherein said constant is dependent upon the impedance or at least one component of the impedance of said load component.

46. Apparatus according to claim 45, wherein said signal processing arrangement is adapted to compare said third and fourth parameters to generate said output by comparing the result of multiplying each said fourth parameter by said constant with each said third parameter; wherein said constant includes the reciprocal of the impedance or part thereof of said load component.

47. Apparatus according to claim 38, wherein said signal processing arrangement is adapted to determine an estimate of noise in the measurements using averages of said third and fourth parameters over a plurality of measurements, and to ignore the current comparison of said third and fourth parameter if said noise is above a threshold.

48. A method of generating an output dependent upon the impedance or at least one component of the impedance of a device, the method comprising:

connecting a load component having a known impedance or at least one component of the impedance in series with the device to allow for the measurement of a voltage drop across the load component;

applying a signal having a voltage to the series connected load component and device;

measuring a first voltage one side of said load component, and a second voltage on the other side of said load component or a difference voltage comprising the voltage difference across said load device; and processing the measurements to generating an output dependent upon the impedance or at least one component thereof, wherein said processing comprises:

determining a first parameter indicative of the complex amplitude of the first voltage on a first side of said load component connected to said device, and a second parameter indicative of the complex amplitude of said difference voltage or a calculated difference voltage comprising the difference between the first and second voltages;

multiplying each of the first and second determined parameters by the complex conjugate of the second determined parameter to generate third and fourth parameters respectively; and comparing said third and fourth parameters to generate said output or comparing one or more components or derivatives of the third parameter and said fourth parameter.

49. A method according to claim 48, including repeating said determining step to determine a plurality of first and second parameters, repeating said multiplying step to generate a plurality of said third and fourth parameters, and averaging said third and fourth parameters, wherein said comparing step comprises comparing the averaged third and fourth parameters.

50. A method according to claim 48, wherein said processing includes multiplying said first voltage measurement by a factor based on a phase inverse of a complex signal of which the generated electrical signal is a part to determine the first parameter, multiplying said second voltage measurement by said factor to determine an interim parameter, and subtracting said first parameter from said interim parameter to determine said second parameter.

51. A method according to claim 48, wherein said processing including multiplying said first voltage measurement by a factor based on a phase inverse of a complex signal of which the generated signal is a part to determine said first parameter, determining a difference voltage using said first and second voltage measurements, and multiplying said difference voltage by said factor to determine said second parameter.

52. A method according to claim 48, wherein said processing includes multiplying said first voltage measurement by a factor based on a phase inverse of a complex signal of which the generated signal is a part to determine said first parameter, and multiplying said voltage difference measurement by said factor to determine said second parameter.

53. A method according to claim 48, wherein said measurement channel includes an analogue-to-digital converter for generating digital voltage measurements from said voltage measurements, said multiplying includes summing each of the digital voltage measurements multiplied by said factor based on a phase inverse of the generated signal over a plurality of digital samples.

54. A method according to claim 48, wherein said electrical signal comprises a plurality of frequency components and said processing includes determining a first parameter indicative of the complex amplitude of the first voltage on said first side of said load component for each said frequency, and a second parameter indicative of the complex amplitude of the difference between the first and second voltages or said voltage difference for each said frequency, multiplying each of the first and second determined parameters by the complex conjugate of the second determined parameter to generate third and fourth parameters respectively, and comparing said third and fourth parameters to generate said output, or comparing one or more components or derivatives of the third and fourth parameters to generate said output.

55. A method according to claim 54, including repeating said determining step to determine a plurality of first and second parameters, repeating said multiplying step to generate a plurality of said third and fourth parameters, and averaging said third and fourth parameters, wherein said comparing step comprises comparing the averaged third and fourth parameters.

56. A method according to claim 48, wherein said processing includes comparing said third and fourth parameters using a constant, wherein said constant is dependent upon the impedance or part thereof of said load component.

57. A method according to claim 56, wherein said processing includes comparing said third and fourth parameters by comparing the result of multiplying each said fourth parameter by said constant with each said third parameter; wherein said constant includes the reciprocal of the impedance or part thereof of said load component.

58. A method according to claim 48, wherein said processing includes determining an estimate of noise in the measurements using averages of said third and fourth parameters over a plurality of measurements, and ignoring the current comparison of said third and fourth parameters if said noise is above a threshold.

59. Apparatus for generating an output in dependence upon the impedance or at least one component of the impedance of a device, the apparatus comprising:
    a load component having a known impedance or at least one component of impedance for connection in series with the device to allow for the measurement of a voltage drop across the load component;
    a generator arrangement for applying a time-varying voltage signal to the series connected load component and device;
    a measurement channel for measuring voltage;
    a switch arrangement for switching the measurement channel to sequentially measure a first voltage a first side of said load component and a difference voltage between said first side and a second side of said load component; and
    a signal processing arrangement for processing the measurements to generate an output in dependence upon the impedance or at least one component of the impedance.

60. A method of generating an output in dependence upon the impedance or at least one component of the impedance of a device, the method comprising:
    connecting a load component having a known impedance or at least one component of the impedance in series with the device to allow for the measurement of a voltage drop across the load component;
    applying a time-varying voltage signal to the series connected load component and device;
    sequentially measuring a first voltage on a first side of said load component and a difference voltage between said first side and a second side of said load component using a measurement channel; and
    processing the measurements to generate an output in dependence upon the impedance or at least one component of the impedance.

61. A method of identifying a device having an impedance characteristic as a function of frequency, the method comprising:
    applying signals of a first and second frequency to said device;
    obtaining measurements indicative of a first voltage one side of said load component, and one of a second voltage on the other side of said load component or a difference voltage comprising the voltage difference across said load device, the measurements being obtained at both said frequencies;
    determining a value dependent on the impedances for said device at said frequencies using said measurements, including the steps of:
        determining first and second parameters indicative of the complex amplitude, at said first and second frequency respectively, of the first voltage on a first side of said load component connected to said device;
        determining third and fourth parameters indicative of the complex amplitude, at said first and second frequency respectively, of said difference voltages or a calculated difference voltage comprising the difference between the first and second voltages;
        multiplying each of the first and third determined parameters by the complex conjugate of the third determined parameter to generate fifth and sixth parameters respectively;
        multiplying each of the second and fourth determined parameters by the complex conjugate of the fourth determined parameter to generate seventh and eighth parameters respectively; and
        performing a comparison using said fifth, sixth, seventh and eighth parameters to determine said value or performing a comparison using one or more components or derivatives of said fifth, sixth, seventh and eighth parameters to determine said value;
    using said value to identify said device; and
    generating an output identifying said device.

62. A method according to claim 61, wherein said value is determined by testing the inequality between a constant multiplied by a first set of the parameters or values derived therefrom and a second set of parameters or values derived therefrom.

63. A method according to claim 61, further comprising:
    determining the complex conjugate of the fifth and seventh parameters to generate ninth and tenth parameters respectively;
    determining the square of the sixth and eight parameters to generate eleventh and twelfth parameters respectively;
    wherein the step of performing a comparison comprises comparing the product of values relating to the fifth, ninth and twelfth parameters with the product of values relating to the seventh, tenth and eleventh parameters.

64. A method according to claim 61, wherein the step of performing a comparison comprises comparing the product of the fifth, ninth and twelfth parameters with a constant multiplied by the product of the seventh, tenth and eleventh parameters.

65. A method of identifying a device having an impedance characteristic as a function of frequency, the method comprising:
applying signals of a first and second frequency to said device;
obtaining first and second parameters indicative of the complex amplitude, at said first and second frequency respectively, of the first voltage on a first side of said load component connected to said device;
obtaining third and fourth parameters indicative of the complex amplitude, at said first and second frequency respectively, of said difference voltages or a calculated difference voltage comprising the difference between the first and second voltages;
multiplying each of the first and third parameters by the complex conjugate of the third determined parameter to generate fifth and sixth parameters respectively;
multiplying each of the second and fourth parameters by the complex conjugate of the fourth determined parameter to generate seventh and eight parameters respectively;
comparing at least one of said parameters for said device with corresponding at least one parameters for at least one other device to identify said device; and
outputting a value indicative of said identity of said device.

66. A proximity sensor for sensing the proximity of a target comprising:
an electrical component for sensing the proximity of the target, said electrical component having electrical properties that vary with the proximity of the target;
an impedance component having a known impedance and a first end connected to a first end of said electrical component;
an analog difference amplifier connected to said first end and a second end of said impedence component;
a switch connected to switch between said first end of said impedance component and an output of said analog difference amplifier;
a signal generator connected to said second end of said impedance component for generating an electrical signal for application to the impedance component and electrical component;
an analog-to-digital converter for receiving an electrical signal and for generating a digital signal; and
a processor connected to the analog-to-digital converter for receiving a digital voltage signal and for generating a proximity signal, wherein said processor is adapted to control said switch to switch to connect to said first and second ends of said impedance component sequentially.

67. Apparatus according to claim 66, wherein said electrical component comprises an inductor or a capacitor.

68. Apparatus according to claim 66, wherein said impedance component comprises a resistor or an inductor.

69. Apparatus for generating an output dependent upon the impedance or at least one component of the impedance of a device, the apparatus comprising:
a load component having a known impedance for connection in series with the device to allow for the measurement of a voltage drop across the load component;
a generator arrangement for applying a time-varying voltage across the series connected load component and device;
a measurement arrangement adapted to sequentially measure a first voltage on a first side of said load component, and a difference voltage comprising the voltage difference between said first side and a second side of said load device; and
a signal processing arrangement for processing the measurements to generate an output dependent upon the impedance of said device;
wherein said signal processing arrangement is adapted to monitor said measurements to detect fault conditions in said device and to output a warning output if a fault condition is detected.

70. Apparatus according to claim 69, wherein said signal processing arrangement is adapted to detect a fault condition when at least one said measurement is outside a predetermined threshold or range.

71. A method for generating an output dependent upon the impedance or at least one component of the impedance of a device, the method comprising:
connecting a load component having a known impedance in series with the device to allow for the measurement of a voltage drop across the load component;
applying a time-varying voltage across the series connected load component and device;
sequentially measuring a first voltage on a first side of said load component, and a difference voltage comprising the voltage difference between said first side and a second side of said load device;
processing the measurements to generating an output dependent upon the impedance of said device;
monitoring said measurements to detect fault conditions in said device and outputting a warning output if a fault condition is detected.

72. A method according to claim 71, wherein said monitoring step detects a fault condition when at least one said measurement is outside a predetermined threshold or range.

73. A method of identifying a device having an impedance characteristic as a function of frequency, the method comprising:
applying at least two frequency signals to said device;
obtaining measurements indicative of the voltage across said device and the current flowing through said device at said frequencies;
processing said measurements in a multiplicative and non divisional manner to determine if a first impedance or part of the impedance of the device at a first frequency has a predefined inequality relationship with a second impedance or part of the impedance of the device at a second frequency, without calculating either impedance;
identifying the device in dependence upon the predefined inequality relationship; and
outputting a value indicative of said identity of said device.

74. A method according to claim 73, wherein said predefined inequality relationship defines whether a first factor related to the first impedance is greater than or less than a second factor related to the second impedance times a predetermined constant, said constant being predetermined for identification of the device.

75. A method according to claim 73, wherein said first frequency is below a frequency at which eddy currents are small in the device.

* * * * *